United States Patent
Van Dyke, Jr. et al.

[15] 3,671,530

[45] June 20, 1972

[54] CERTAIN SUBSTITUTED 1,3-BISDILOWER-ALKYLAMINOETHOXY-INDANS

[72] Inventors: John William Van Dyke, Jr., Elkhart; Margaret Jo Van Laecke, Osceola, both of Ind.

[73] Assignee: Miles Laboratories, Inc., Elkhart, Ind.

[22] Filed: Aug. 27, 1970

[21] Appl. No.: 67,637

[52] U.S. Cl. ..................... 260/295 F, 260/296 B, 260/570.7, 260/501.17
[51] Int. Cl. .................................. C07c 93/06, C07d 31/42
[58] Field of Search .......... 260/296 B, 570.7, 501.17, 295 F, 260/295 S

[56] References Cited

UNITED STATES PATENTS 3,159,634  12/1964  David et al. ..........................260/570.7
3,415,873  12/1968  Marcus et al. .......................260/570.7

*Primary Examiner*—Alan L. Rotman
*Attorney*—Joseph C. Schwalbach, Louis E. Davidson and Harry T. Stephenson

[57] ABSTRACT

Certain diaminoalkyl ethers of substituted 1,3-indandiols and a method for their preparation are disclosed. These compounds are useful as antihistaminics.

5 Claims, No Drawings

CERTAIN SUBSTITUTED 1,3-BISDILOWER-ALKYLAMINOETHOXY-INDANS

SUMMARY OF THE INVENTION

Compounds embraced within the present invention have the formula

A

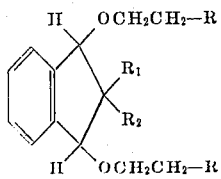

in which each R is diloweralkylamino wherein loweralkyl contains from one to four carbon atoms, $R_1$ is phenyl or pyridyl and $R_2$ is lower-alkyl. These compounds exhibit potent antihistaminic activity when compared in vitro to diphenhydramine using the isolated guinea pig tracheal preparation in the usual manner. More specifically, it was found that 1,3-di(2-N,N-dimethylaminoethoxy-2-methyl-2-phenylindane and 1,3-di-(2-N,N-dimethylaminoethoxy)-2-methyl-2(2'-pyridyl)indane were respectively 4.2 and 1.5 times more potent than diphenhydramine employed as a reference antihistaminic.

The new compounds disclosed herein can be prepared as shown in the following sequence of reactions:

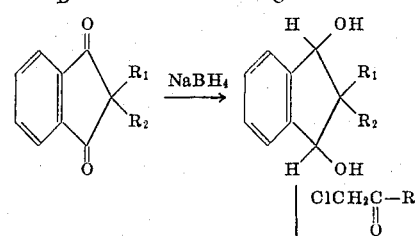
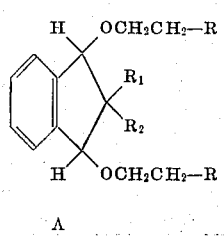
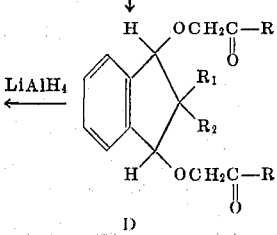

In carrying out these reactions, compound B is reduced with an alkali metal borohydride in the presence of an alcohol, preferably methanol, under reflux conditions to form compound C which is refluxed with a chlorodialkyl acetamide in the presence of an alkali metal hydride and an inert solvent such as benzene. The resulting diamide D is thereafter reduced with lithium aluminum hydride by refluxing in an inert solvent to obtain the desired free base A which can be readily converted to an acid addition salt by treatment in an alcoholic solvent with oxalic acid, hydrochloric acid, maleic acid and the like.

DESCRIPTION OF THE PREFERRED EMBODIMENTS

EXAMPLE 1

$R_1$ is pyridyl, $R_2$ is methyl and each R is dimethylamino in formula A.

A mixture of 18.5 grams of the potassium salt of 2-pyridyl-1,3-indandione (melting at 290° C.), 10 grams of methyl iodide and 100 ml. of xylene was heated at 210° C. for 20 hours in an autoclave. After filtering, the solvent was evaporated and the residue crystallized from ether to obtain 1.6 grams of 2-methyl-2-(2'-pyridyl)-1,3-indandione as a white solid with a melting point of 138° C.

The dione thus prepared was dissolved in 50 ml. of methanol and refluxed for 3 hours with 1.5 grams of sodium borohydride after which time the solvent was evaporated. Water was then added to the residue and the organic layer was extracted with chloroform. The extract was dried, the solvent removed under vacuum and the residue crystallized from ether to yield one gram of 2-methyl-2-(2'-pyridyl)-1,3-indandiol as a tan solid which melted at 152° C.

The one gram of diol was refluxed for one hour with 50 ml. of benzene and 0.4 gram of sodium hydride. One gram of α-chloro-N,N-dimethylacetamide was then added and the mixture refluxed with stirring for 20 hours. After cooling, the mixture was treated with methanol, the solvent evaporated and the residue treated with chloroform and water. The chloroform layer was dried and evaporated to dryness. Pentane was added to the residue which was then chromatographed on an alumina column and eluted with ether to obtain 1.2 grams of 1,3-di-(N,N-dimethylamidomethoxy)-2-methyl-2-(2'-pyridyl)indane.

In the final step of the synthesis, the indane thus prepared was dissolved in tetrahydrofuran and refluxed for 18 hours in the presence of 2 grams of lithium aluminum hydride. The reaction mixture was filtered, the filtrate concentrated and the residue dissolved in a mixture of chloroform and water. The organic layer was separated and chromatographed on an alumina column. Upon elution with ether, 0.2 gram of an oily product was obtained which was dissolved in a mixture of methanol and 2-propanol and 0.15 gram of oxalic acid added thereto. The precipitate was recrystallized from methanol to obtain 0.2 gram of 1,3-di-(2-N,N-dimethylaminoethoxy)-2-methyl-2-(2'-pyridyl)indane dioxalate as a white solid with a melting point of 185° C. and a nitrogen content of 7.42 percent compared to the calculated value of 7.45 percent nitrogen.

EXAMPLE 2

$R_1$ is phenyl, $R_2$ is methyl and each R is dimethylamino in formula A.

A mixture of 6 grams (0.025 mole) of 2-methyl-2-phenyl-1,3-indandione (melting point = 155° C.) and 2 grams of sodium borohydride in 300 ml. of methanol was refluxed for 4 hours. The solvent was then removed, the residue extracted with chloroform and the solvent again removed to obtain 6 grams of 2-methyl-2-phenyl-1,3-indandiol corresponding to formula C in which $R_1$ is phenyl and $R_2$ is methyl.

To 2.4 grams (0.01 mole) of the indandiol in 80 ml. of benzene was added one gram of sodium hydride and 3 grams of α-chloro-N,N-dimethylacetamide. After refluxing the mixture for 20 hours, the solvent was removed and the residue extracted with chloroform. Upon removal of the solvent, 3.6 grams of diamide corresponding to formula D was obtained in which $R_1$ is phenyl, $R_2$ is methyl and each R is dimethylamino.

A mixture of 1 gram of the diamide and 1 gram of $LiAlH_4$ in tetrahydrofuran was refluxed for 24 hours. The solvent was then removed, the residue extracted with chloroform and the solvent again removed to obtain 0.8 gram of a yellow oil which was dissolved in methanol and reacted with oxalic acid as previously described to obtain 0.18 gram of 1,3-di(2-N,N-dimethylaminoethoxy)-2-methyl-2-phenylindane dioxalate melting at 172° C. Upon analysis this product had a nitrogen content of 4.83 percent versus the calculated value of 4.98 percent nitrogen.

By reacting 2-phenyl-1,3-indandione or 2-pyridyl-1,3-indandione with a loweralkyl halide such as ethyl bromide, propyl chloride or butyl iodide as described in Step 1 of Example 1, the corresponding 2-phenyl-2-loweralkyl and 2-pyridyl-2-loweralkyl-1,3-indandiones are readily obtained. These compounds when reduced with $NaBH_4$, then reacted with chlorodiethylacetamide, chlorodi-n-propylacetamide or chlorodi-t-butyl-acetamide according to the procedure shown in the foregoing examples, result in compounds represented by formula D in which each R is diethylamino, di-n-propylamino or di-t-butylamino; and reduction of the so produced compounds with $LiAlH_4$ yields compounds of formula A in which $R_1$ is phenyl or pyridyl, $R_2$ is ethyl, propyl or butyl and each R is diethylamino, di-n-propylamino or di-t-butylamino.

What is claimed is:

1. A compound of the formula

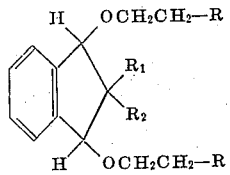

in which $R_1$ is a member of the group consisting of phenyl and pyridyl, $R_2$ is loweralkyl containing from one to four carbon atoms and each R is diloweralkylamino and pharmacutically acceptable acid addition salts thereof.

2. A compound as in claim 1 in which $R_1$ is pyridyl, $R_2$ is methyl and each R is dimethylamino.

3. A compound as in claim 1 in which $R_1$ is phenyl, $R_2$ is methyl and each R is dimethylamino.

4. The dioxalate of the compound of claim 2.

5. The dioxalate of the compound of claim 3.

* * * * *